United States Patent [19]
Hirao et al.

[11] Patent Number: 5,358,090
[45] Date of Patent: Oct. 25, 1994

[54] AUTOMATIC SORTING APPARATUS

[75] Inventors: Toru Hirao; Hideki Sato, both of Hanno, Japan

[73] Assignee: Tsubakimoto Chain, Co., Osaka, Japan

[21] Appl. No.: 214,360

[22] Filed: Mar. 16, 1994

[30] Foreign Application Priority Data

Mar. 23, 1993 [JP] Japan .................... 5-018888

[51] Int. Cl.$^5$ ............................................. B65G 37/00
[52] U.S. Cl. .................. 198/370; 198/463.5; 198/366
[58] Field of Search ............ 198/362, 366, 368, 367.1, 198/370, 372, 531, 463.5, 678.1

[56] References Cited

U.S. PATENT DOCUMENTS

| | | | |
|---|---|---|---|
| 2,776,741 | 1/1957 | Carrier, Jr. ................. | 198/370 |
| 3,799,318 | 3/1974 | DeKoekkoek ................. | 198/463.5 |
| 3,894,625 | 7/1975 | Boyle et al. ................. | 198/370 X |
| 5,125,513 | 6/1992 | Branch ................. | 198/370 X |

OTHER PUBLICATIONS

U.S. patent application Ser. No. 08/207,362–Mar. 7, 1994–Trolley Apparatus With Improved Unloader Hirao et al.–Attorney Docket No. SKK89USA.
U.S. patent application Ser. No. 08/214,362–Mar. 16, 1994–Trolley With Improved Transfer Apparatus Hirao et al.–Attorney Docket No. SKK90USA.

Primary Examiner—James R. Bidwell
Attorney, Agent, or Firm—Howson and Howson

[57] ABSTRACT

Apparatus for automatically sorting articles on hangers comprises a take-in chain to convey the articles to a downward sloping member having a stop. A pivoted lifting hook feeds articles one by one over the stop and onto a horizontal guide bar. The articles are propelled, in spaced relation to one another, along the guide bar by chain-driven pawls. The guide bar has gaps, which are normally bridged by pivotable sorting members. The sorting members may be selectively pivoted downwardly to deliver articles to sorting chutes, which are disposed so that they are in alignment with the sorting members when the sorting members are tilted downwardly.

1 Claim, 11 Drawing Sheets

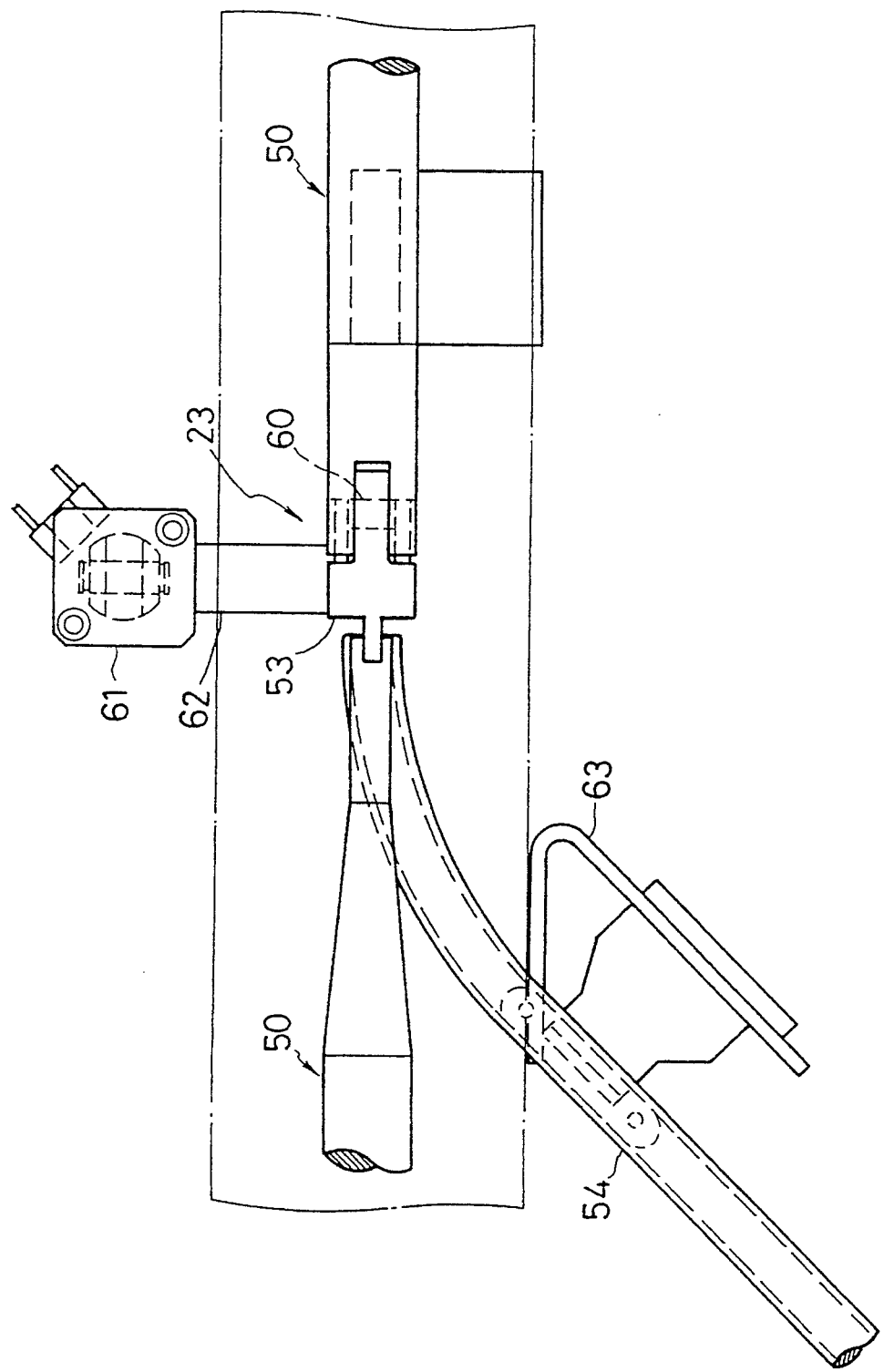

AUTOMATIC SORTING APPARATUS

BRIEF SUMMARY OF THE INVENTION

This invention relates generally to sorting of articles, and more particularly to an apparatus for automatically sorting articles suspended on hangers, for example articles of clothing, in accordance with specified sorting requirements.

Conventionally, articles on hangers are sorted manually. However, manual sorting is not only inaccurate but also time-consuming.

The principal object of this invention is to sort articles on hangers with improved speed and efficiency. Another object of the invention is to sort articles more accurately. Still another object of the invention is to provide a sorting apparatus in which the articles to be sorted can be carried on a take-in conveyor in random order and randomly spaced from one another. Another object of this invention is to provide an apparatus for automatically sorting articles which requires a minimal amount of space in which to operate. Still a further object of the invention is to provide a sorting apparatus for articles on hangers, in which the hangers are securely supported at all times, so that inadvertent dropping of hangers, and the articles thereon, is avoided.

The improved sorting apparatus in accordance with the invention comprises take-in conveyor means for conveying articles on hangers, first guide means extending obliquely downwardly from the take-in conveyor means for supporting hooks of hangers received thereon from the conveyor means, stop means located on the first guide means in the path of the hooks of the hangers and engageable by the hooks for stopping the downward movement of the hooks on the first guide means, pivoted lifting means for lifting hanger hooks engaged with the stop means over the stop means, and second guide means extending away from the first guide means for supporting hooks of hangers received thereon from the first guide means. The second guide means comprises an elongated member having a plurality of gaps spaced along its length and pivotable sorting members normally bridging the gaps. The pivotable member at each gap is pivoted at the side closest to the first guide member, and the pivotable sorting members are pivotable downwardly to open the gaps. Means are provided for moving articles along the second guide means, and sorting chutes extend obliquely downwardly from the second guide means. The sorting chutes are aligned with the pivotable sorting members when the sorting members are pivoted downwardly. Articles, spaced apart from one another by the pivoted lifting means, are transported, in spaced relation to one another, along the second guide means, and may be individually routed to selected sorting chutes by selectively pivoting the sorting members.

Further objects, details and advantages of the invention will be apparent from the following detailed description, when read in conjunction with the drawings.

BRIEF DESCRIPTION OF THE DRAWINGS

FIG. 11 is a top plan view of the elements shown in FIG. 10.

DETAILED DESCRIPTION

Figure 1:
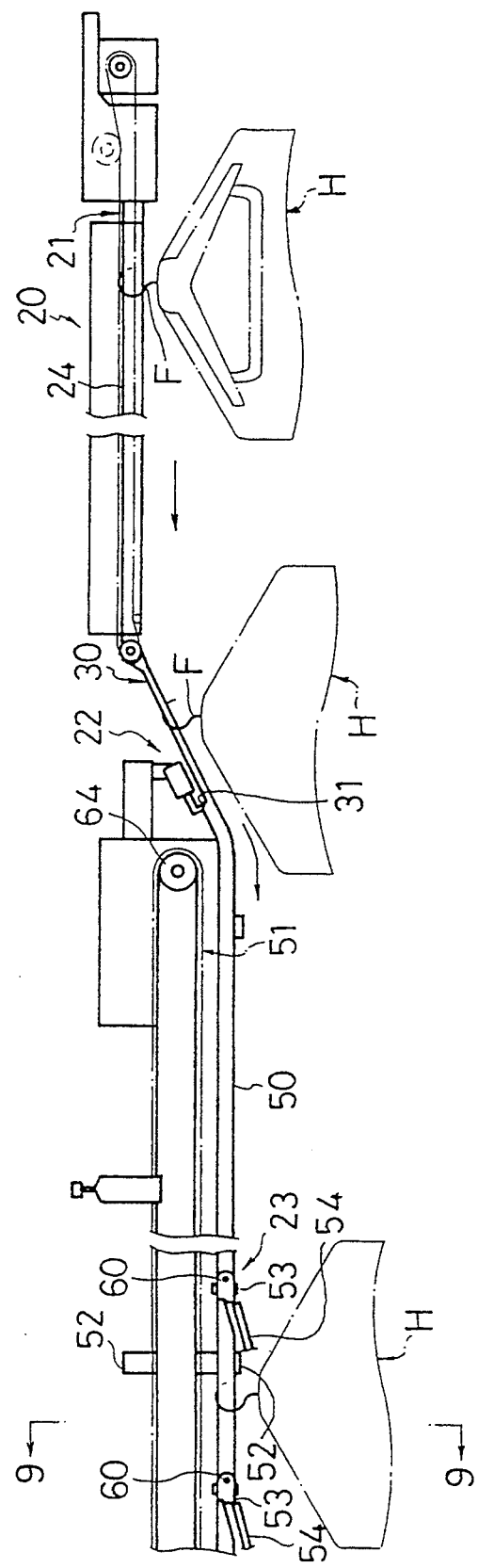
FIG. 1 is a fragmentary elevational view of a sorting apparatus in accordance with the invention, showing a take-in chain conveyor, a downwardly extending guide, a separator on the guide, and a multi-section guide bar with pivoted sorting members disposed in gaps therein.

As shown in FIG. 1, the principal components of the article sorting system 20 are the take-in conveying chain 21, the separator 22 and the sorting apparatus 23.

Figure 2:
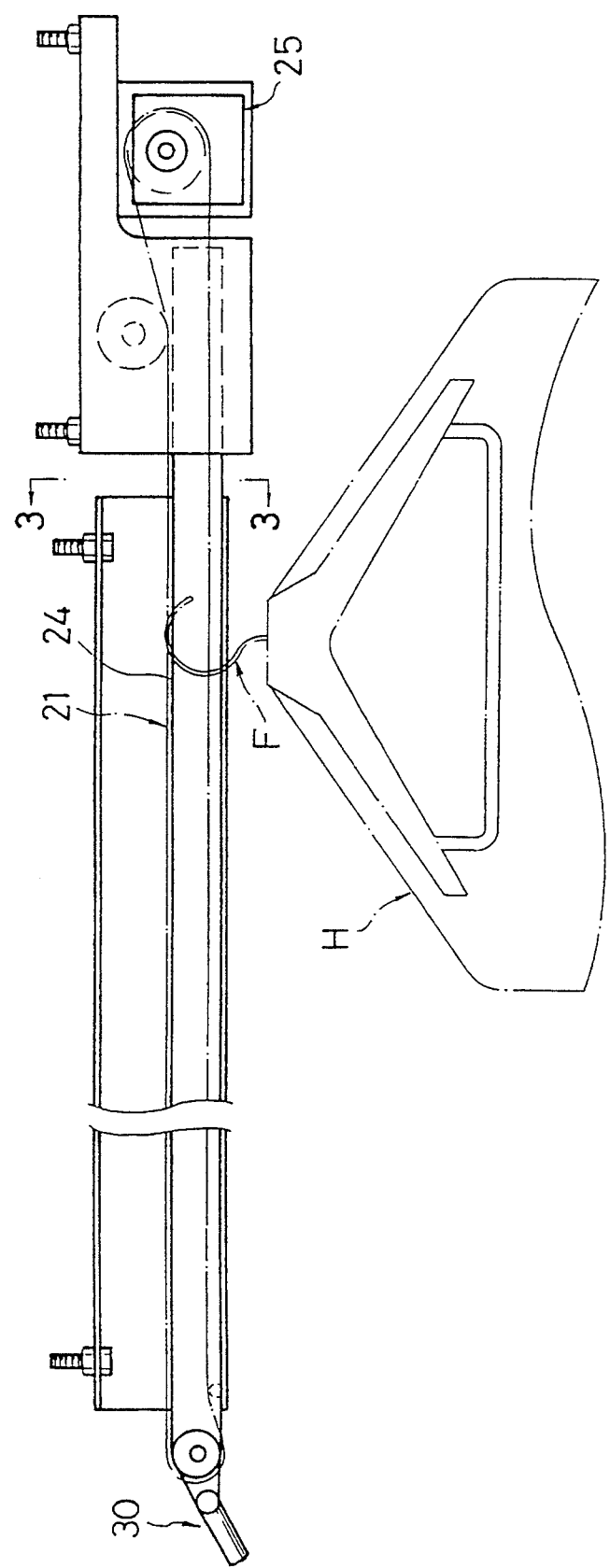
FIG. 2 is a more detailed front elevational view showing the take-in chain conveyor.
Figure 3:
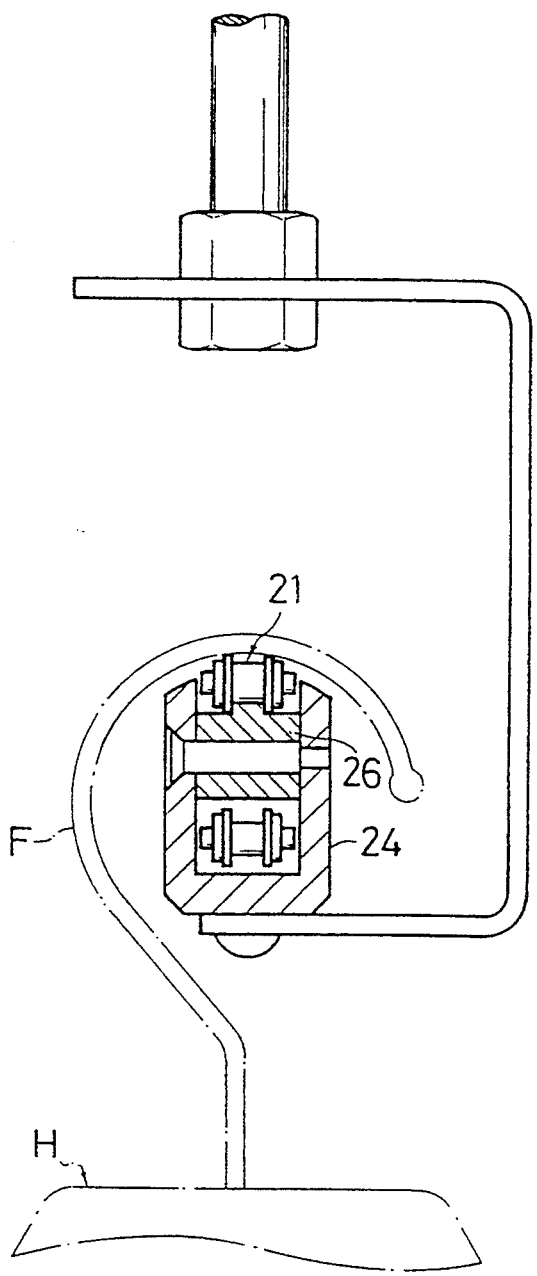
FIG. 3 is a sectional view taken on plane 3—3 of FIG. 2.

The take-in chain 21 feeds articles H on hangers suspended from the upper run of the chain to the separator 22, as shown in FIGS. 1, 2, and 3.

The chain 21 is disposed in an endless loop, and is driven by an electric motor 25 (FIG. 2) and guided by a guide frame 24, having an open-topped, U-shaped cross-section, as shown in FIG. 3. The upper run of the chain 21 is supported by a plate 26 within the guide frame 24, and protrudes through the upper opening of the guide frame 24 so that the hook portions F of hangers rest on, and are transported by, the upper run of the chain 21.

The purpose of the separator 22 is to feed articles H one at a time, at predetermined intervals, to the sorting apparatus 23, even when articles are conveyed into the system en masse.

As illustrated in FIGS. 4–8, the separator 22 comprises a sloping guide member 30 extending downwardly from the outlet end of the take-in conveyor, a stop 31, a lifting hook 32, and a pneumatic cylinder 33.

The sloping guide member 30 is disposed so that it forms a downwardly sloping guide path which is continuous with the take-in conveyor. The sloping guide member 30 extends downwardly from the outlet end of the take-in conveyor so that it forms a continuation thereof to receive hangers discharged from the take-in conveyor.

The stop 31 is located at an intermediate position, between the upper end and the lower end of the sloping guide member.

Figure 6:
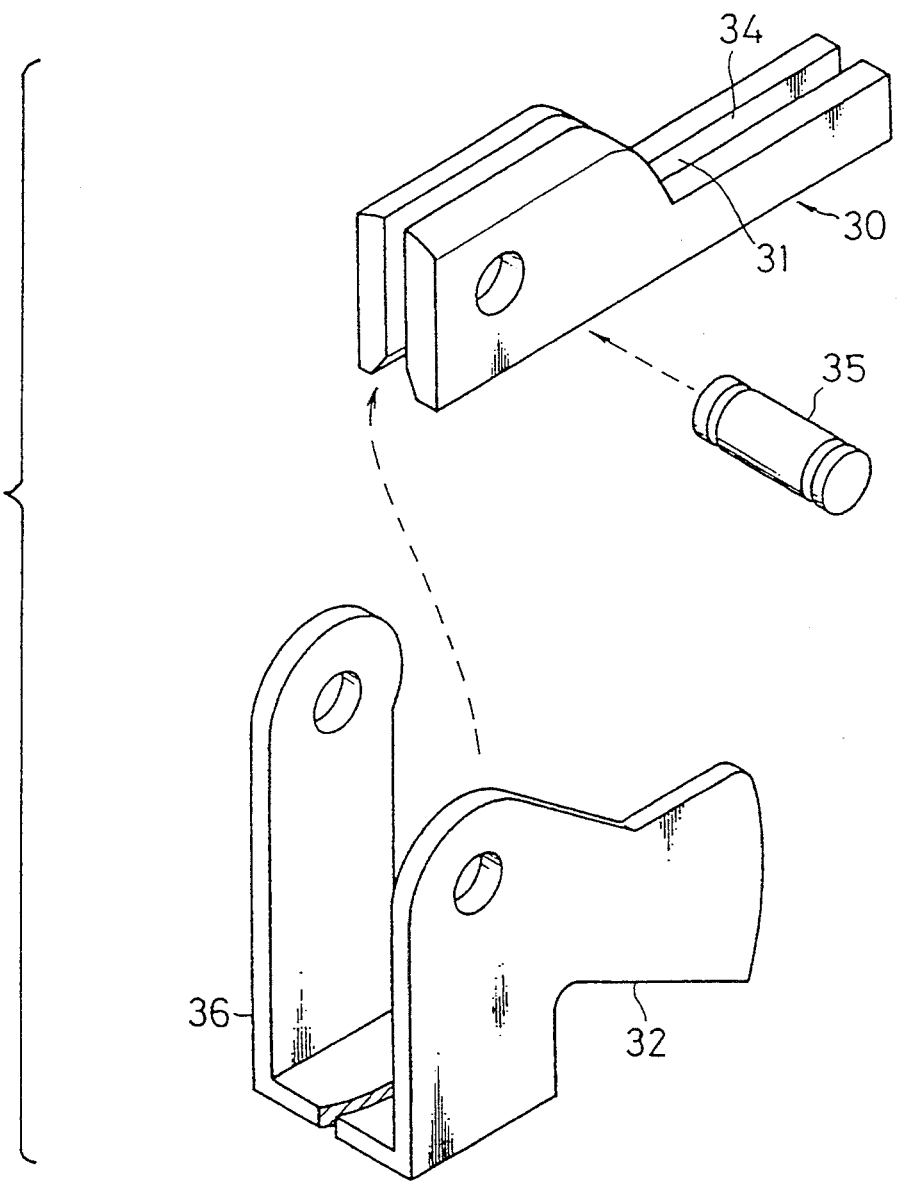
FIG. 6 is an exploded view showing components of the separator.

A longitudinal slot 34 is formed in the sloping guide member 30, as shown in FIG. 6. A lifting hook 32 is inserted in slot 34. The lifting hook 32 is pivoted on a horizontal pivot pin 35, which is secured to the sloping guide member 30 by snap rings (not shown).

Figure 4:
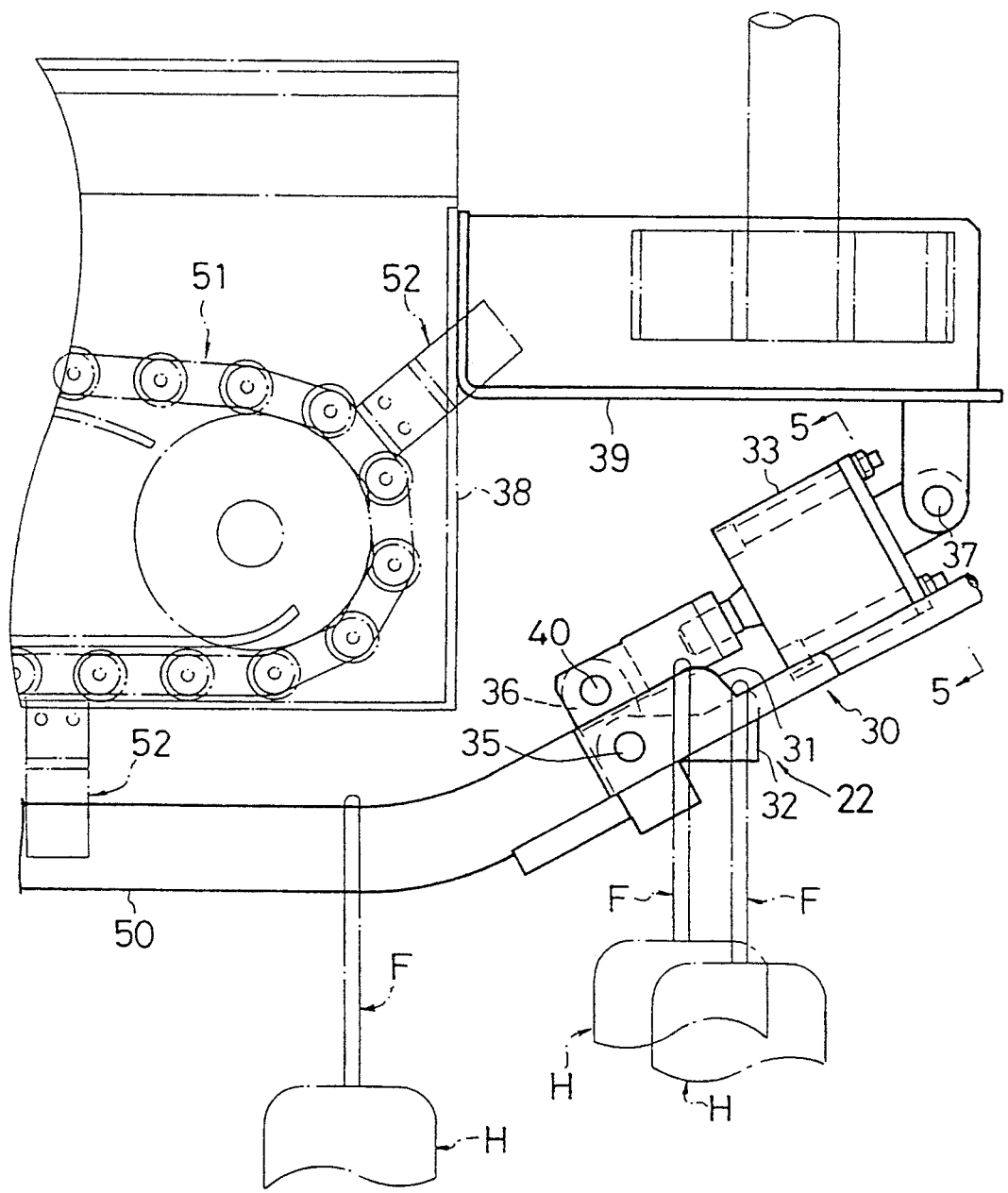
FIG. 4 is a more detailed, fragmentary, front elevational view showing the separator.
Figure 5:
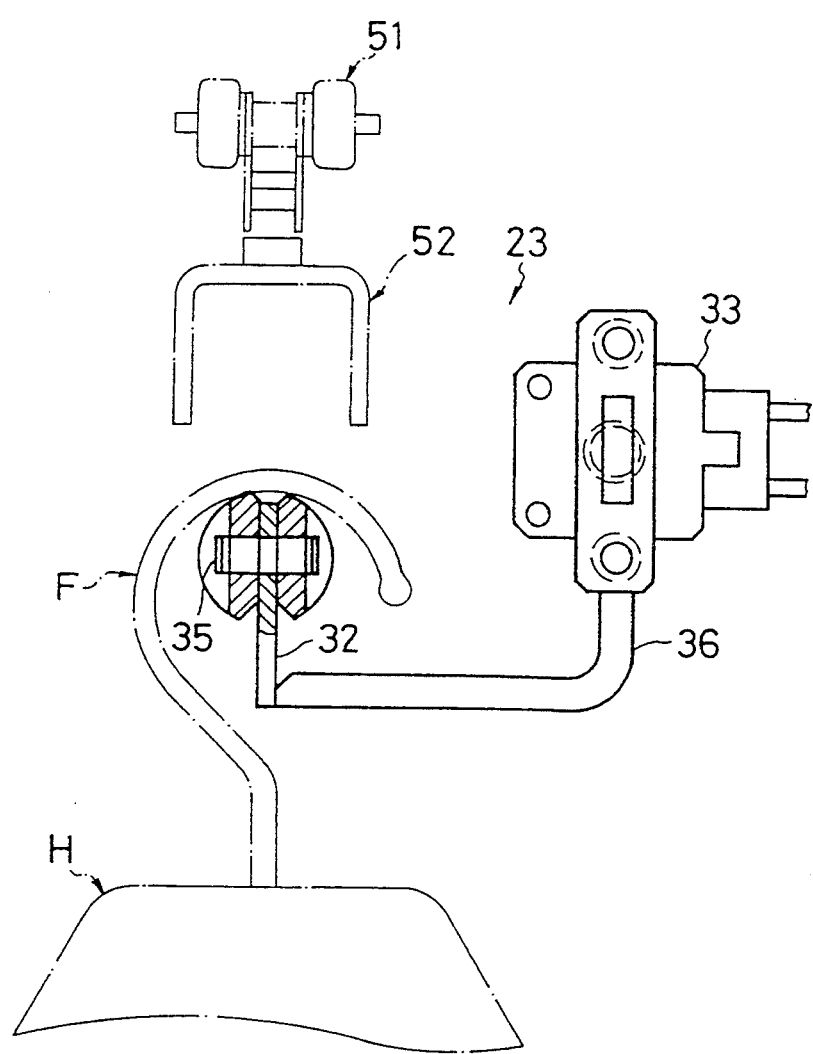
FIG. 5 is a partially broken-away sectional view taken on plane 5—5 of FIG. 4.

As shown in FIG. 4, the lifting hook 32 is connected to a pneumatic actuator 33 through a connecting plate 36 and a pin 40. The lifting hook 32 and the connecting plate 36 are formed as a unitary, channel-shaped member.

The pneumatic actuator 33 is tiltable relative to a frame 38, being pivoted on a depending portion of a bracket 39 by pin 37.

Figure 7:
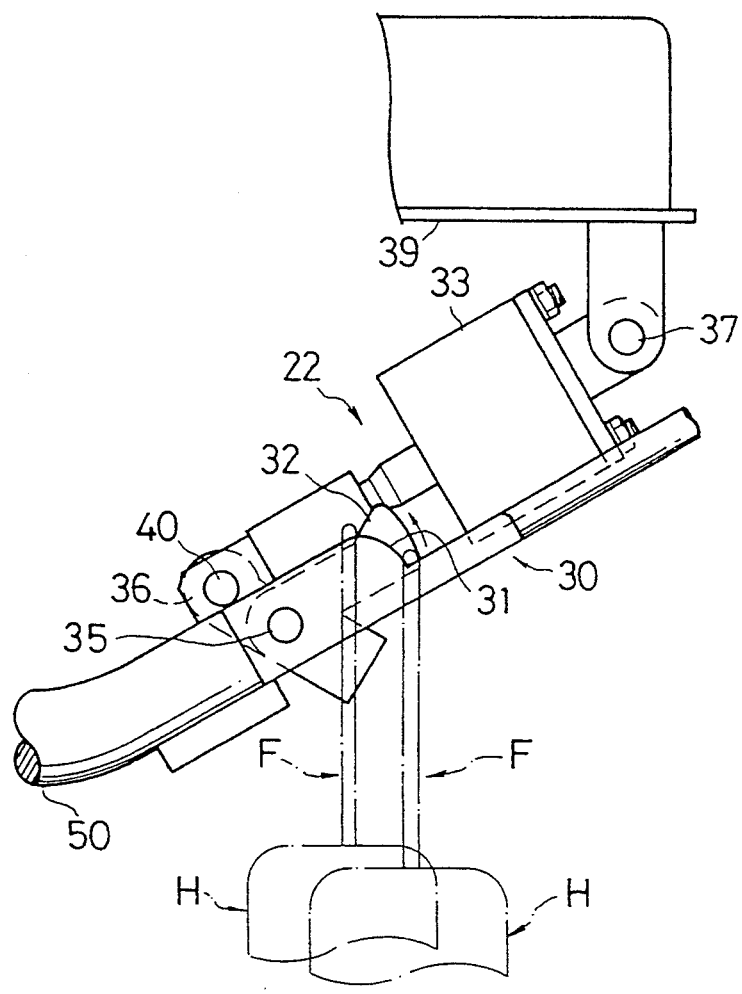
FIG. 7 is a fragmentary front elevational view illustrating the operation of the separator.

In the operation of the apparatus just described, articles H are conveyed on hangers along the take-in chain 21, and slide down the sloping guide member 30, until they engage stop 31. The pneumatic cylinder 33 rotates the lifting hook 32 upward. This pushes the hook F of an article-carrying hanger over the stop 31, as shown in FIGS. 4 and 7.

Figure 8:
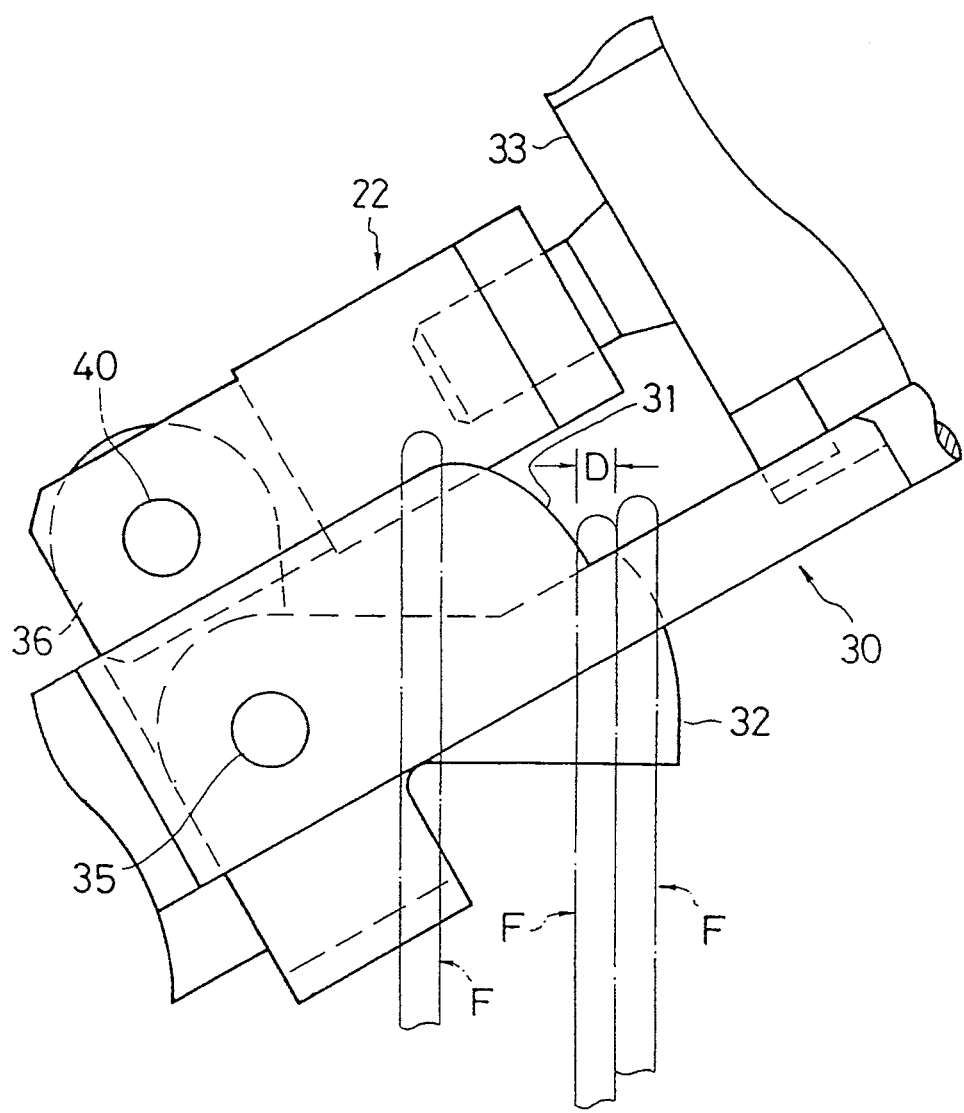
FIG. 8 is a still more detailed front elevational view illustrating the relationship between the components of the separator.

As shown in FIG. 8, the end of the lifting hook 32 projects beyond the stop 31 by a distance substantially equal to the diameter D of the hook portion F of a hanger. This ensures that, if several hangers have accumulated against stop 31, the hook 32 only pushes articles H over the stop 31 one at a time.

The pneumatic actuator 33 is operated at regular intervals, and consequently, articles H are fed, over stop 31, to the sorting apparatus 23 one at a time at regular predetermined intervals.

The sorting apparatus 23 shown in FIGS. 1, 9, 10 and 11, sorts the articles H fed to it, one by one, by the separator 22.

The sorting apparatus 23 comprises a guide bar 50, a second conveying chain 51, pusher pawls 52, sorting members 53, and sorting chutes 54.

The guide bar 50 is suspended from the frame 38 and is connected to the lower end of the sloping guide member 30. The guide bar 50 is made up of several sections, separated by gaps.

The second chain 51 moves in a closed path, being guided by frame 38. A plurality of pusher pawls 52 is provided on chain 51, preferably at uniform intervals. The pusher pawls 52 protrude from the chain 51 so that they engage the hook portions F of the hangers, and push the hangers along the guide bar 50.

The sorting members 53 are disposed in the gaps between individual sections of the guide bar 50. The sorting members are pivoted on horizontal pins 60 so that they can tilt from a horizontal position to a downwardly sloping position. When the sorting members 53 are horizontal, they cooperate with guide bar 50 to provide a continuous guide on which hanger hooks can slide. The sorting bars are supported from underneath by suspension links 62, which are connected to pneumatic actuators 61 secured to the frame 38.

Figure 10:
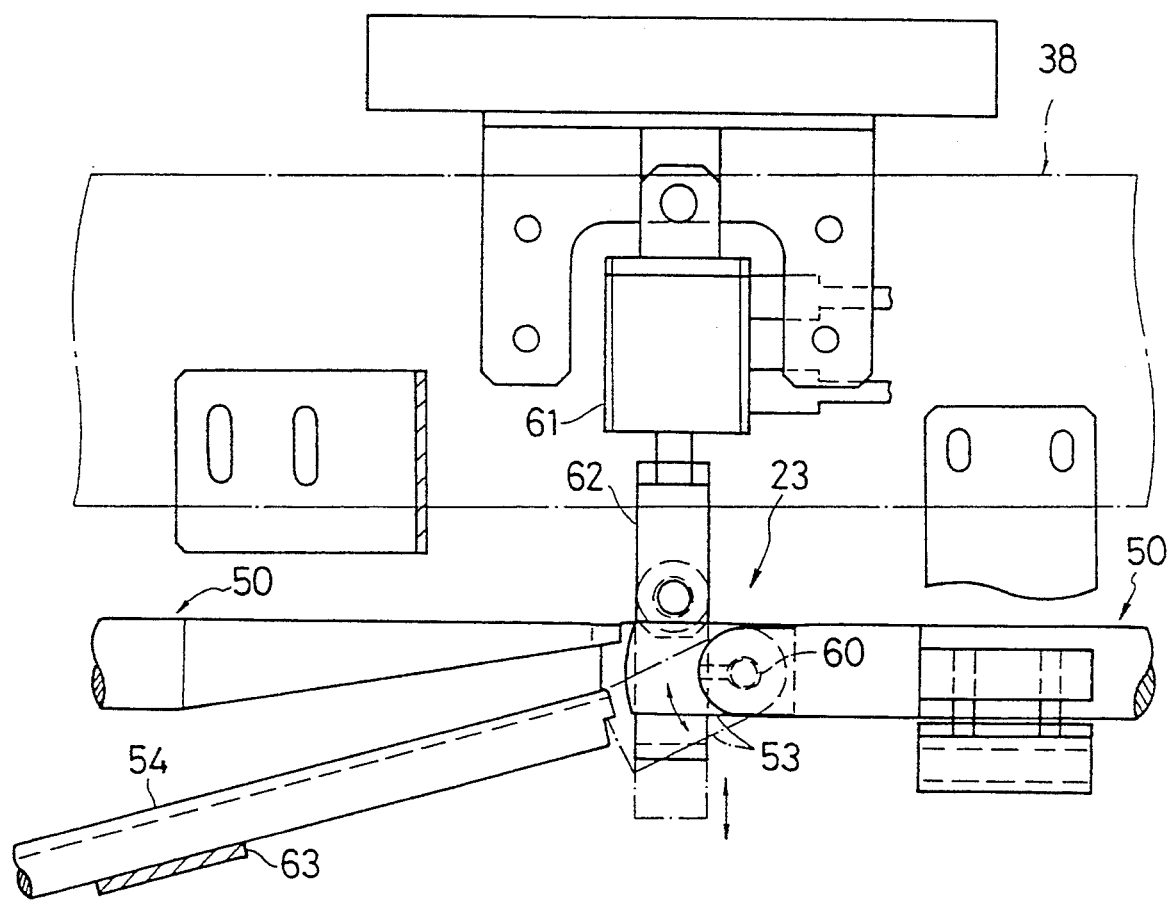
FIG. 10 is a fragmentary front elevational view showing a pivoted sorting member in the gap of the multi-section guide bar.

Downwardly sloping sorting chutes 54, mounted on support plates 63, are disposed beneath the guide bar 50 adjacent to sorting members 53. The upper end of each sorting chute 54 is positioned so that it is met by the lower end of a sorting member 53 when the sorting member is tilted downwardly, as shown in FIG. 10. Thus, when a sorting member 53 is tilted downwardly, it serves as a sloping guide which is continuous with the adjacent sorting chute. Therefore, when a sorting member tilts downwardly, a gap is formed in rod 50, and a hanger hook portion can travel through the gap, and slide over the downwardly tilted sorting member onto the adjacent chute 54.

Figure 9:
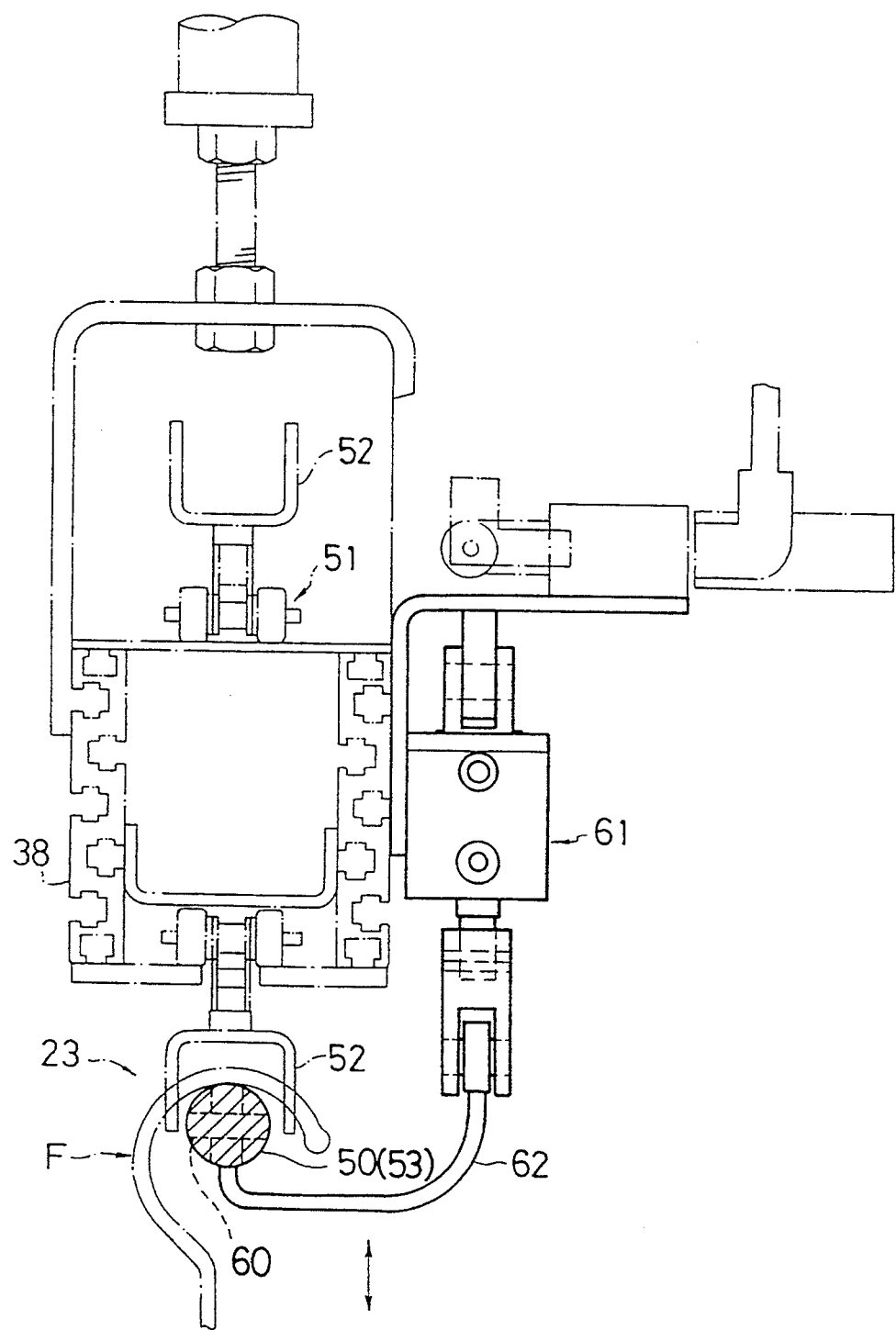
FIG. 9 is a sectional view, taken on plane 9—9 of FIG. 1, and showing the multi-section guide bar and associated apparatus for moving hangers along the multi-section guide bar.

In the operation of the sorting apparatus just described, pusher pawls 52, driven by the second chain 51, push articles along the guide bar 51, as shown in FIG. 9. When an article H is traveling across a specified sorting member 53, the corresponding pneumatic actuator 61 may be operated to lower the suspension link 62. Gravity causes the sorting member 53 to tilt downwardly as the corresponding suspension link 62 is lowered. The article H is thereby discharged from the guide bar 50 onto a sorting chute 54.

The sorting member 53 is restored to its original horizontal position as soon as the article H has been discharged. Once the sorting member 53 is restored to its original position, articles pass along it to be received by other sorting members 53 and sorting chutes 54.

The position of an article at the location of a sorting member 53 can be accurately determined by an encoder (not shown) driven by motor 64, which drives chain 51. Thus, the timing of the opening of the sorting members can be accurately synchronized with the movement of the hangers along guide rod 50.

In the overall operation of the sorting system just described, the take-in chain 21 conveys articles H to the sloping guide member 30. The articles H subsequently slide down guide member 30 and engage stop 31. The lifting hook 32 pushes articles H over the stop 31 at regular intervals. The articles H are thereafter pushed along the guide bar 50 by pawls 52 provided on the second conveying chain 51. When an article H is at the position at which it is to be discharged to a sorting chute, i.e. on a specified sorting member 53, that sorting member is pivoted downwardly to discharge the article H onto the adjacent sorting chute 54. Thereafter, the sorting member 53 pivots back to the horizontal position, to allow other articles to continue along the guide bar 50.

The automatic sorting of articles by the apparatus described above can be carried out more efficiently and more accurately than with prior sorting equipment. The apparatus is advantageous from the standpoint of space requirements, since it can be laid out linearly and horizontally. Sorting can be conducted securely, since each hanger, after it is lifted over the stop, is always in contact with the guide bar, a sorting member or a sorting chute.

Various modifications can be made to the apparatus described. For example, the openings of the sorting members can be synchronized with the movement of hangers along the guide bar by detectors. The lifting hook can be operated at non-uniform intervals, provided that appropriate corresponding modifications are made to the sorting apparatus. Still other modifications can be made to the apparatus described herein without departing from the scope of the invention as defined in the following claims.

We claim:

1. An apparatus for sorting articles on hangers comprising:
   take-in conveyor means for conveying articles on hangers;
   first guide means extending obliquely downwardly from said take-in conveyor means for supporting hooks of hangers received thereon from said conveyor means;
   stop means located on the first guide means in the path of the hooks of said hangers and engageable by said hooks for stopping the downward movement of the hooks on the first guide means;
   pivoted lifting means for lifting hanger hooks engaged with the stop means over the stop means;
   second guide means extending away from said first guide means for supporting hooks of hangers received thereon from said first guide means, said second guide means comprising an elongated member having a plurality of gaps spaced along its length;

pivotable sorting members normally bridging said gaps, the pivotable member at each gap being pivoted at the side closest to the first guide member, said pivotable sorting members being pivotable downwardly to open the gaps;

means for moving articles along the second guide means; and sorting chutes extending obliquely downwardly from the second guide means, said sorting chutes being aligned with the pivotable sorting members when said sorting members are pivoted downwardly;

whereby articles, spaced apart from one another by the pivoted lifting means, are transported, in spaced relation to one another, along the second guide means, and may be individually routed to selected sorting chutes by selectively pivoting said sorting members.

* * * * *